(12) United States Patent
Phoon et al.

(10) Patent No.: US 9,143,664 B2
(45) Date of Patent: Sep. 22, 2015

(54) CAMERA MODULE WITH MAGNETIC SHIELDING AND METHOD OF MANUFACTURE

(71) Applicant: FLEXTRONICS AP, LLC, Broomfield, CO (US)

(72) Inventors: Hong Wei Phoon, Bukit Mertajam (MY); Giap Chye Toh, Penang (MY); Yeow Thiam Ooi, Penang (MY)

(73) Assignee: Flextronics AP, LLC, Broomfield, CO (US)

( * ) Notice: Subject to any disclaimer, the term of this patent is extended or adjusted under 35 U.S.C. 154(b) by 88 days.

(21) Appl. No.: 13/780,032

(22) Filed: Feb. 28, 2013

(65) Prior Publication Data

US 2013/0242181 A1    Sep. 19, 2013

Related U.S. Application Data (63) Continuation of application No. 13/543,343, filed on Jul. 6, 2012, now abandoned.

(60) Provisional application No. 61/504,778, filed on Jul. 6, 2011.

(51) Int. Cl.
| | |
|---|---|
| *H04N 5/225* | (2006.01) |
| *G02B 7/04* | (2006.01) |
| *G03B 17/02* | (2006.01) |
| *G03B 3/10* | (2006.01) |

(52) U.S. Cl.
CPC ............... *H04N 5/2253* (2013.01); *G02B 7/04* (2013.01); *H04N 5/2254* (2013.01); *G03B 3/10* (2013.01); *G03B 17/02* (2013.01); *G03B 2205/0069* (2013.01); *Y10T 29/49002* (2015.01)

(58) Field of Classification Search
CPC .......................................................... G02B 7/04
USPC .................................................. 348/373, 374
See application file for complete search history.

(56) References Cited

U.S. PATENT DOCUMENTS

| | | | |
|---|---|---|---|
| 5,754,621 A * | 5/1998 | Suzuki et al. | 378/57 |
| 7,619,684 B2 * | 11/2009 | Nishida et al. | 348/374 |
| 2005/0007481 A1 | 1/2005 | Yamaguchi | |
| 2006/0043260 A1 | 3/2006 | Ma et al. | |
| 2006/0132644 A1 | 6/2006 | Shangguan et al. | |
| 2010/0150545 A1 * | 6/2010 | Imai et al. | 396/535 |
| 2011/0050979 A1 * | 3/2011 | Rudmann | 348/335 |
| 2011/0121666 A1 * | 5/2011 | Park et al. | 310/15 |
| 2011/0234890 A1 * | 9/2011 | Kobayashi et al. | 348/373 |

* cited by examiner

*Primary Examiner* — Twyler Haskins
*Assistant Examiner* — Akshay Trehan
(74) *Attorney, Agent, or Firm* — Haverstock & Owens LLP (57) ABSTRACT

A method for manufacturing camera modules for use in portable electronic devices, such as mobile phones, is provided. More specifically, in camera modules utilizing lens motion type auto focus actuation, permanent magnets associated with voice coil motors utilized in the auto focus system, generate magnetic flux that can interfere with the process of bonding image sensors to camera modules if the permanent magnets of different voice coil motors are positioned too closely. Incorporating a magnetic shield into the manufacturing process to restrain or control the magnetic flux generated by the permanent magnets permits voice coil motors camera modules to be positioned closer together during the manufacturing process. This increases manufacturing throughput and reduces cost.

21 Claims, 8 Drawing Sheets

CAMERA MODULE WITH MAGNETIC SHIELDING AND METHOD OF MANUFACTURE

CROSS REFERENCE

This application is a continuation of U.S. patent application Ser. No. 13/543,343 filed Jul. 6, 2012, entitled "Camera Module with Magnetic Shielding and Method of Manufacture," which is the non-provisional of U.S. Provisional Pat. App. No. 61/504,778 filed Jul. 6, 2011, entitled "Camera Module with Magnetic Shielding and Method of Manufacture," which are hereby incorporated in their entirety by reference.

BACKGROUND

The disclosure herein relates generally to electronic devices, and more particularly to digital camera modules. Even more particularly, it relates to a digital camera module manufacturing technique.

Digital camera modules are currently being incorporated into a variety of electronic devices. Such camera hosting devices include, but are not limited to, cellular telephones, personal digital assistants (PDAs), and computers. The demand for digital camera modules continues to grow as the ability to incorporate the camera modules into host devices expands. Therefore, one design goal of digital camera modules is to make them as small as possible so that they will fit into an electronic device without substantially increasing the overall size of the device. Means for achieving this goal must, of course, preserve the quality of the image captured by the camera modules.

Such digital camera modules typically include a substrate, an image capture device, a housing, and a lens unit. The substrate is typically a printed circuit board (PCB) that includes circuitry to facilitate data exchange between the image capture device and the host device. The image capture device is mounted and electrically coupled to the circuitry of the PCB. The housing is then mounted on the PCB over the image capture device. The housing includes an opening that receives and centers the lens unit with respect to the image capture device. The housing may include a voice coil motor (VCM) module for adjusting the position of the lens unit. To save time and costs of manufacturing, a group of camera modules may be simultaneously manufactured in array form.

Figure 1:
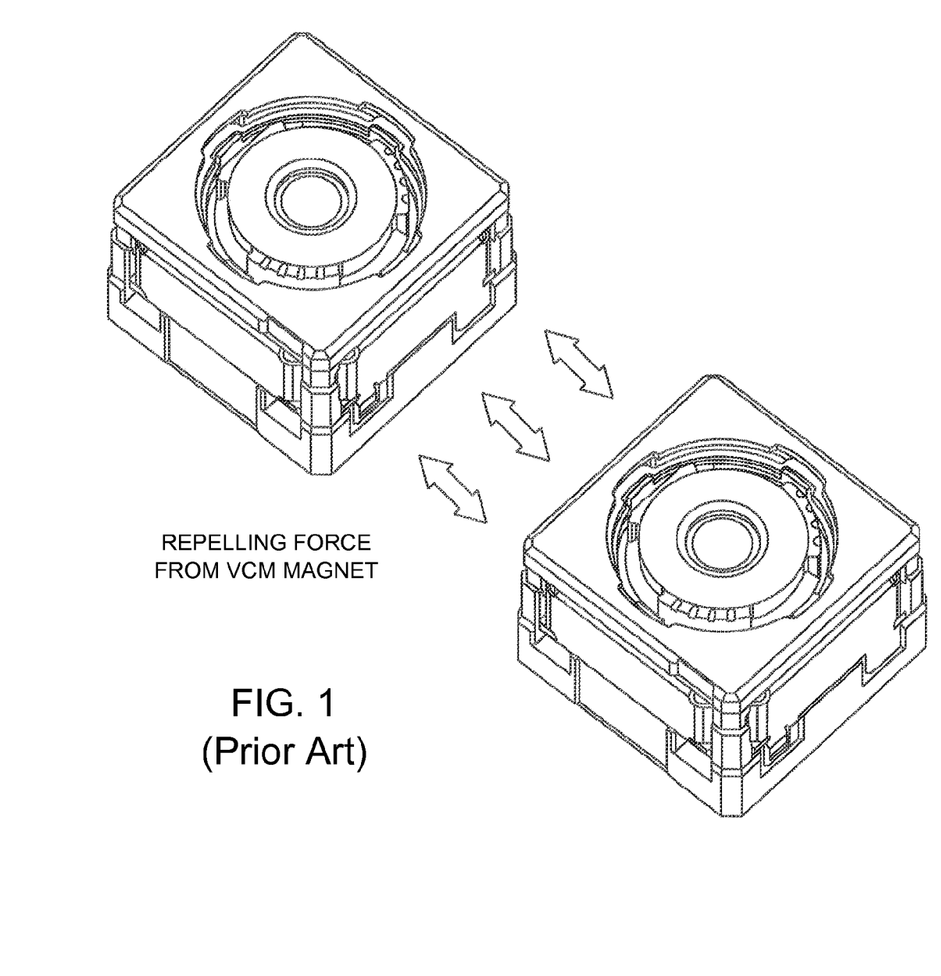
FIG. 1 is a perspective view of the repelling force generated by permanent magnets of two adjacent voice coil motors.

The VCM module may include components such as a frame, permanent magnets, one or more springs, and an EMI shield. The magnets produce a strong magnetic field and will interact with another magnet nearby, such as if another VCM module is nearby. An example of this is shown in FIG. 1. This can present challenges in array manufacturing. Repelling forces from the magnets inside the VCM modules can cause inconsistent repelling distances, in one case in the range of 3.0-4.0 mm. Accordingly, larger spacing between image sensors on the silicon (minimum unit to unit gap 4.50 mm) may be required. This spacing increases the cost per camera module significantly. The EMI shield is designed to significantly block electromagnetic interference or flux, but does not significantly block magnetic flux.

One approach to addressing this problem is to increase the unit to unit gap. That is, increase the unit to unit gap to 4.50 mm in order to minimize the repelling force between the VCM. (Refer to panel layout in FIG. 2). One problem with this approach is that it results in inefficient and costly use of the silicon. Another problem is that the reduced unit quantity per silicon wafer results in a low VCM attach machine throughput (measured in units per hour, or UPH).

Figure 3:
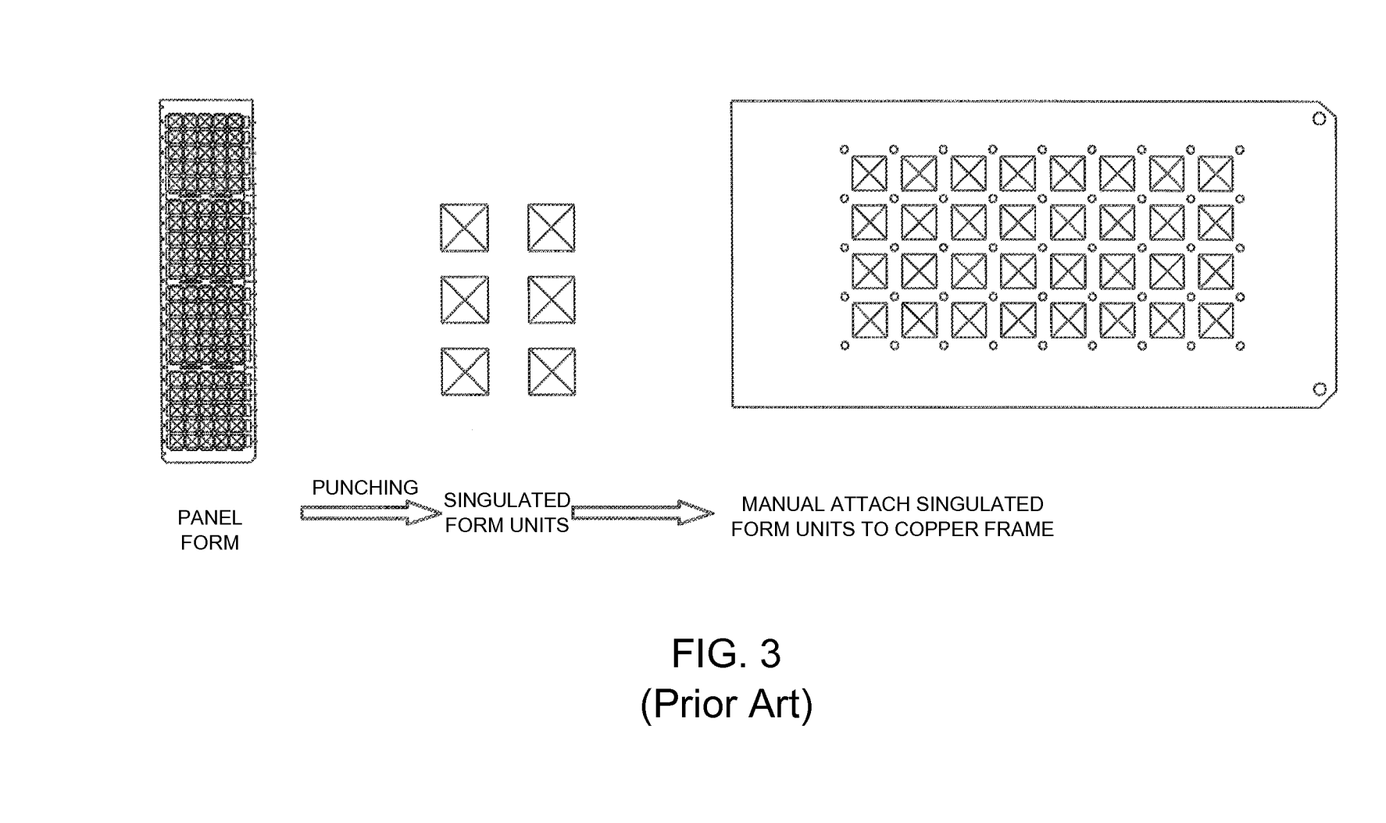
FIG. 3 is a process flow of a method for singulating image sensors and significantly spacing them apart from each other before assembling camera modules.

Another approach to addressing this problem includes the singulation method illustrated in FIG. 3. The image sensors on the silicon can be singulated and attached onto a copper frame with greater spacing than on the silicon. The singulation method is an additional process that increases the manufacturing cost. Also, the singulation method tends to generate particulate debris that can degrade the image quality of the camera module and cause high yield loss.

What is needed, therefore, is a camera module manufacturing technique that is allows for small module spacing in array processing.

SUMMARY

Disclosed herein is a method for manufacturing camera modules that includes: providing a plurality of image sensors on a substrate, including a first and a second image sensor that are adjacent to each other; providing a plurality of VCM modules, including a first and a second VCM module, each VCM module adapted for attachment to an image sensor; providing a plurality of magnetic shields, including a first and a second magnetic shield, each shield adapted for placement over a VCM module; placing the first magnetic shield on the first VCM module and the second magnetic shield on the second VCM module; attaching the first VCM module, with the first magnetic shield thereon, to the first image sensor; and attaching the second VCM module, with the second magnetic shield thereon, to the second image sensor.

The method may further include moving the first and second image sensor, with the VCM modules and magnetic shields thereon, away from each other. The method may further include removing the magnetic shields from the VCM modules. The magnetic shields may include high magnetic permeability metal alloy material.

Also disclosed herein is a camera module that includes: an image sensor; a VCM module attached to the image sensor; and a magnetic shield attached to the camera module so as to surround the VCM module. The magnetic shield significantly reduces a magnetic field from the VCM module in the immediate vicinity around the exterior of the magnetic shield.

The magnetic shield may include high magnetic permeability metal alloy material.

According to one embodiment, a method of manufacturing camera modules is provided comprising providing a plurality of image sensors affixed to a substrate, applying an adhesive to the substrate generally around the perimeter of each image sensor, providing a first voice coil motor and associated movable lens, associating a magnetic shield with the first voice coil motor and lens, positioning the first voice coil motor, lens and associated magnetic shield on the adhesive associated with a first image sensor, providing a second voice coil motor and associated movable lens, associating a second magnetic shield with the second voice coil motor and lens, and positioning the second voice coil motor, lens and associated magnetic shield closely adjacent the first voice coil motor, lens and associated first magnetic shield, wherein the distance separating the first and second voice coil motors is reduced due to the presence of the magnetic shields. As a result, the number of camera modules assembled on the substrate may be increased compared to the number of camera modules that could be assembled on the substrate in the absence of the magnetic shields.

According to a second embodiment, the magnetic shield associated with each voice coil motor and lens may be reused with a different voice coil motor and lens after the adhesive is cured to bond the first voice coil motor to the first image sensor.

According to another embodiment, the magnetic shield is associated with a voice coil motor after the voice coil motor is positioned on adhesive associated with an image sensor. Alternatively, the magnetic shield is associated with the voice coil motor before the voice coil motor is positioned on adhesive associated with an image sensor.

In a further embodiment, the magnetic shield remains associated with the voice coil motor and is included in the final electronic device as part of the camera module.

In a further embodiment, multiple magnetic shields comprise a single, integral structure.

In yet another embodiment, the electromagnetic shield of the voice coil motor is eliminated from the voice coil motor assembly and is replaced by the magnetic shield.

As used herein, the term camera module refers to an individual voice coil motor lens and associated image sensor bonded to a printed circuit board or substrate. Multiple voice coil motors and associated lens and image sensors mounted on a single printed circuit board or substrate is referred to as a camera assembly on a printed circuit board.

The Summary is neither intended nor should it be construed as being representative of the full extent and scope of the present invention. Moreover, reference made herein to "the present invention" or aspects thereof should be understood to mean certain embodiments of the present invention and should not necessarily be construed as limiting all embodiments to a particular description. The present invention is set forth in various levels of detail in the Summary as well as in the attached drawings and the Detailed Description and no limitation as to the scope of the present invention is intended by either the inclusion or non-inclusion of elements, components, etc. in this Summary.

BRIEF DESCRIPTION OF THE DRAWINGS

The disclosure herein is described with reference to the following drawings, wherein like reference numbers denote substantially similar elements.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

Figure 4A:
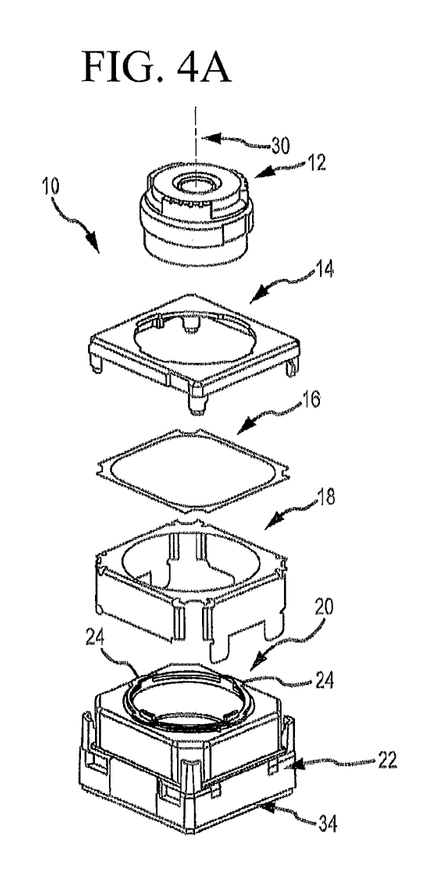
FIGS. 4A, 4B, and 4C are perspective views of portions of a camera module, with the three views showing various degrees of explosion.
Figure 4B:
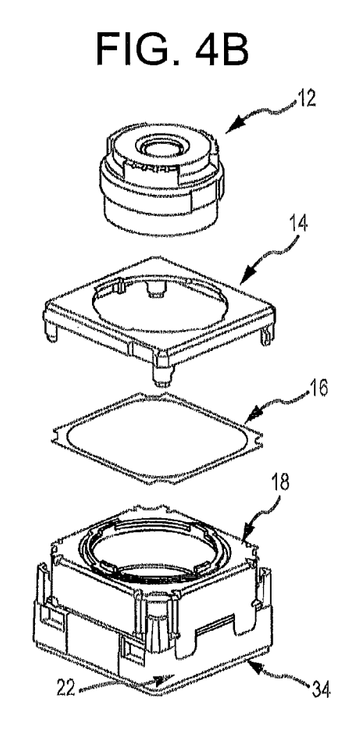
Figure 4C:
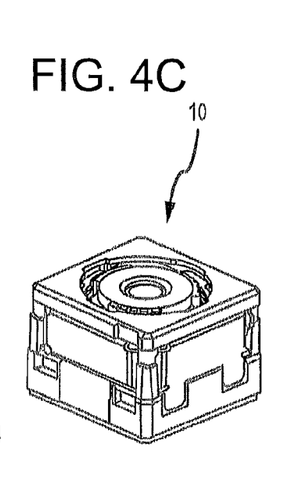

FIGS. 4a-4c are exploded views of a VCM-based camera module 10. In general terms, the camera module 10 includes an axially-movable lens 12, a frame member 14, a voice coil motor top spring 16, an electromagnetic interference (EMI) shield 18, a yoke 20, a base 22, and an image sensor 34. The voice coil motor (formed by the frame 14, spring 16, EMI shield 18, yoke 20, and base 22) serves to adjust the position of the lens 12. In general terms, and with respect to adjustment of the lens 12 position, the voice coil motor of the camera module 10 includes one or more permanent magnets 24 fixed to the yoke 20 and a wire coil associated with the lens housing 28. The coil comprises a number of turns of wire and is positioned radially inwardly from the permanent magnet 24. By driving current through the coil, an electromagnetic field is created which interacts with the magnetic field of the permanent magnet 24 to move the lens 12 and drive the lens 12 outwardly or inwardly along its optical axis 30. Changing direction of the current flowing in the coil causes the lens to move in opposite directions. Moving the lens along its optical axis 30, towards or away from the image sensor 34, to focus a target image on the image sensor 34. One or more springs 16 are utilized to assist in maintaining the orientation of the lens 12 within the camera module 10 and relative to the image sensor 34 and to provide a known resistive or opposing force to the movement imparted by the voice coil motor on the lens 12.

The permanent magnet 24 is generally in the form of a ring or cylinder or may comprise a plurality of arc-shaped magnets which are arranged around the perimeter of the inner wall of the yoke 20. The permanent magnet(s) or magnets generates or creates a magnetic flux field that is always present. In contrast, the coil in combination with the yoke also creates a flux field when current flows through the coil. This latter flux field creates what is known as electromagnetic interference (EMI), which may adversely affect nearby or adjacent electrical circuits. The EMI shield 18 is designed to reduce the adverse effects of EMI on surrounding electronics once the VCM is installed in an electronic device and is in operation with current flowing through the coil.

However, during manufacture, the magnetic flux field created by the permanent magnet adversely affects the manufacturing process and, potentially, the acceptable production yield of camera modules. More specifically, the repelling force or magnetic interference from the permanent magnet(s) inside VCMs in adjacent or proximally located camera modules can cause the camera modules to physically shift or move. This is particularly problematic during the manufacturing step of adhering the VCMs to image sensors 34 on a printed circuit board or substrate where an adhesive is used to bond these two components to a printed circuit board to create camera modules. Alignment of the VCM relative to the image sensor 34 is a critical step in achieving a camera module that outputs acceptable images. If the image sensor 34 and VCM are not properly aligned, the resulting image quality is adversely affected and the camera module formed with the misaligned VCM and image sensor 34 will not pass quality testing and will not be assembled into an electronic device. Thus care must be taken to separate VCMs and associated image sensors 34 a sufficient distance apart from adjacent or proximately positioned VCMs and associated image sensors 34 such that, during the time period before the bonding adhesive fully cures, the repelling force or magnetic interference of nearby permanent magnets does not cause the position of a voice coil motor to shift relative to its associated image sensor 34. Because of the need for adequate spacing between adjacent or proximate VCMs and associated image sensors 34, the maximum number of VCMs and associated image sensors 34 that can be processed at one time in any particular manufacturing process is physically limited. Moreover, the existing EMI shields 18 are not designed to resolve this problem, but are designed solely to restrict electromagnetic flux created by the coil and yoke when current is flowing in the coil.

Figure 5:
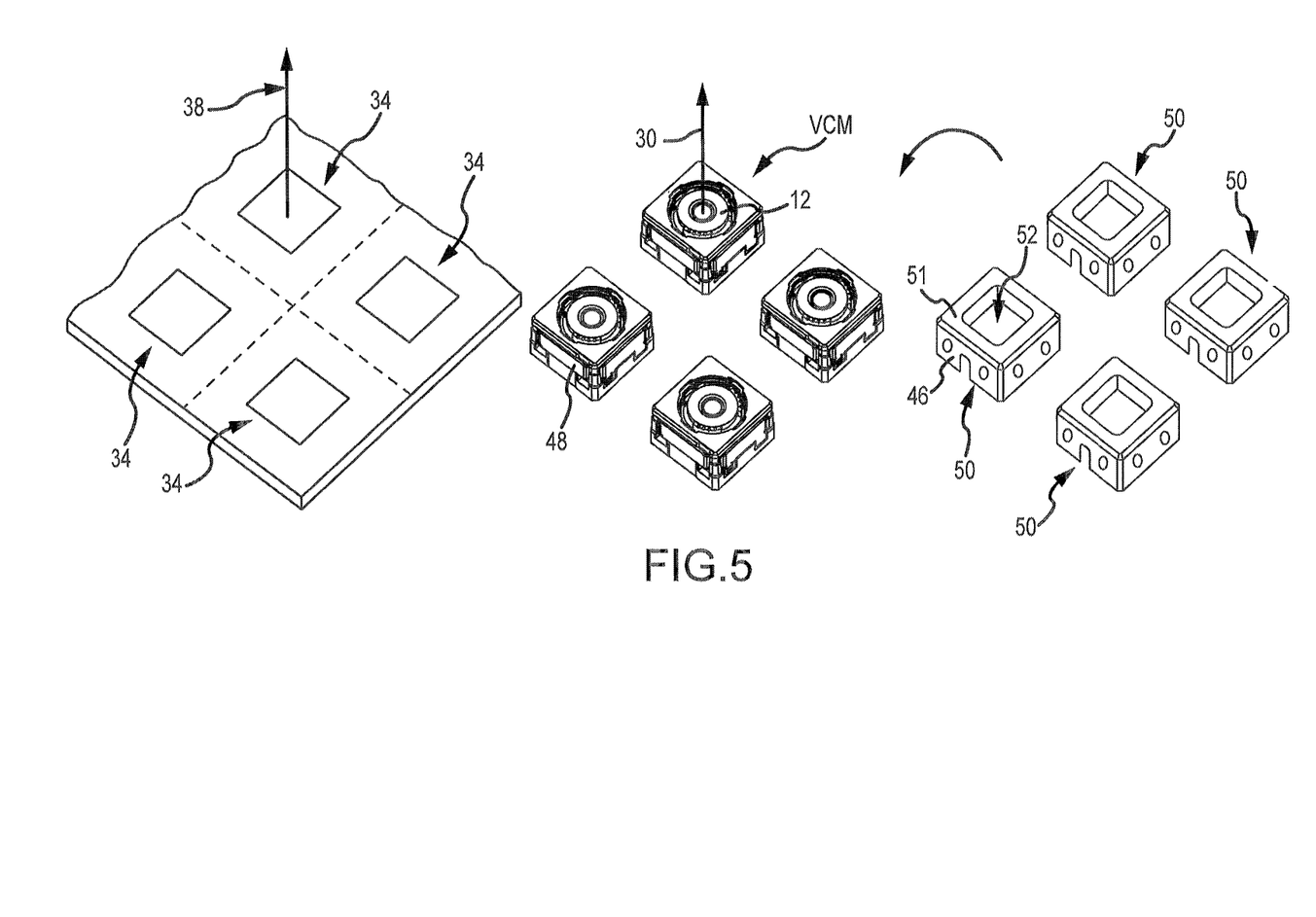
FIG. 5 is a schematic view of an array of image sensors, an array of VCM modules, and an array of magnetic shield caps.

FIG. 5 includes a schematic view of an array of image sensors 34, such as complementary metal oxide semiconductor (CMOS) image sensors or charge coupled device (CCD) image sensors. The image sensors 34 may be already attached to a single substrate, each attached to a separate substrate, each attached together (e.g., as part of a wafer), or otherwise arranged. Also arranged are a plurality of VCMs ready for attachment to the image sensors and a plurality of magnetic shield caps 50 ready for attachment thereto. An optical axis 38 is shown for a representative one of the image sensors 34 and an optical axis 30 for a representative one of the lenses.

Figure 6:
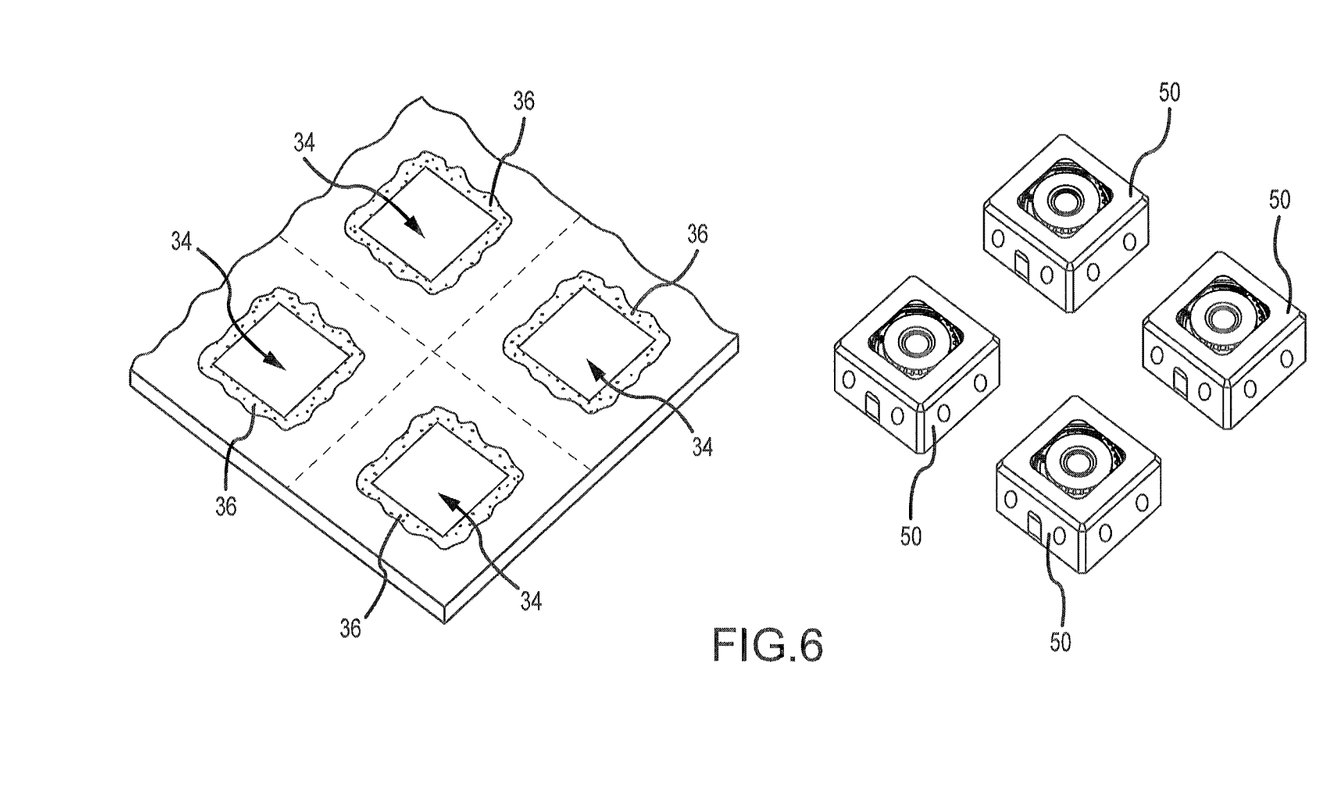
FIG. 6 is a schematic view of an array of image sensors and an array of VCM modules with magnetic shield caps applied thereto.

As is shown in FIG. 6, an epoxy or other adhesive 36 is positioned around the outside of the active area of each of the sensors 34. As part of the manufacturing process, the magnetic shield caps 50 are each placed over a corresponding one of the VCMs.

Figure 7:
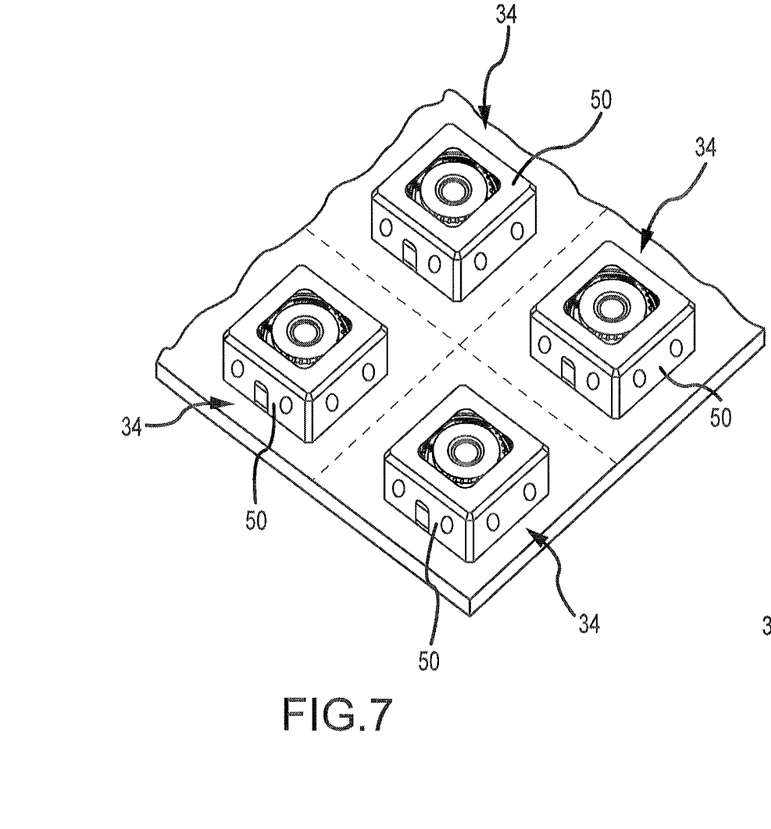
FIG. 7 is a schematic view of an array of image sensors with VCM modules and magnetic shield caps applied thereto.
Figure 8:
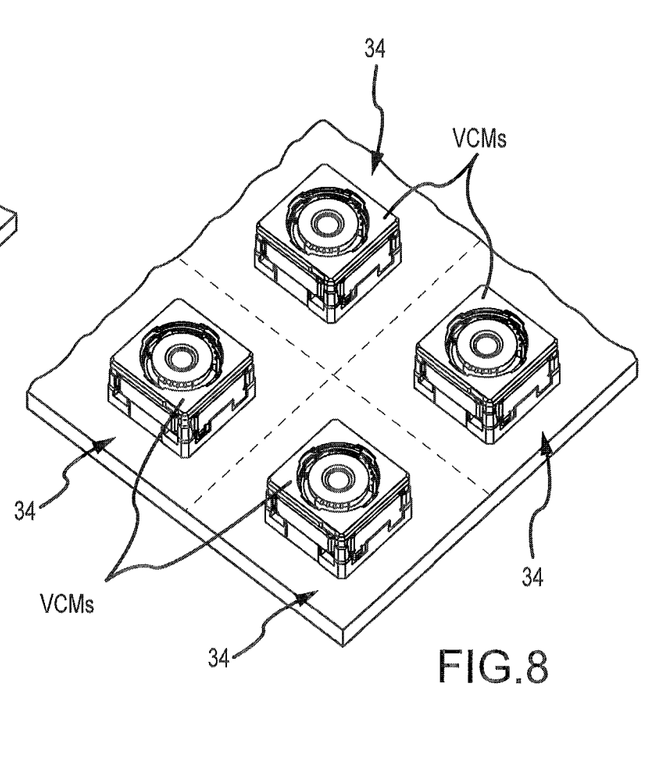
FIG. 8 is a schematic view like FIG. 7, with the magnetic shield caps removed therefrom.

As shown in FIG. 7, the VCMs (with the magnetic shield caps thereon) are next affixed to the image sensors 34 via the adhesive associated with each individual image sensor 34. This may be accomplished with robotics, such as a pick and place machine, or manually. The entire array of assembled camera modules (with magnetic shield caps thereon) may then be positioned within an oven to cause curing of the adhesive 36 such that the VCM camera module and image sensor 34 are effectively bonded together to form a camera module. As part of the positioning and curing steps, the optical axis 30 of the lens 12 can be kept in alignment with the optical axis 38 of the image sensor 34, since the magnetic shield caps 50 help to prevent the magnetic flux from the permanent magnets in the VCMs from affecting the relative positioning of adjacent VCMs. Note that while the adhesive is described as having been applied to the top surface of the image sensor 34, it may alternatively be applied to a substrate to which the image sensor 34 is applied. Alternatively, some other means of connection of the VCMs to the image sensors may be achieved.

Following curing the adhesive, the assembled camera modules may be separated or singulated resulting in individual camera modules, depending on whether the image sensors were still part of a wafer or otherwise arranged.

Figure 2:
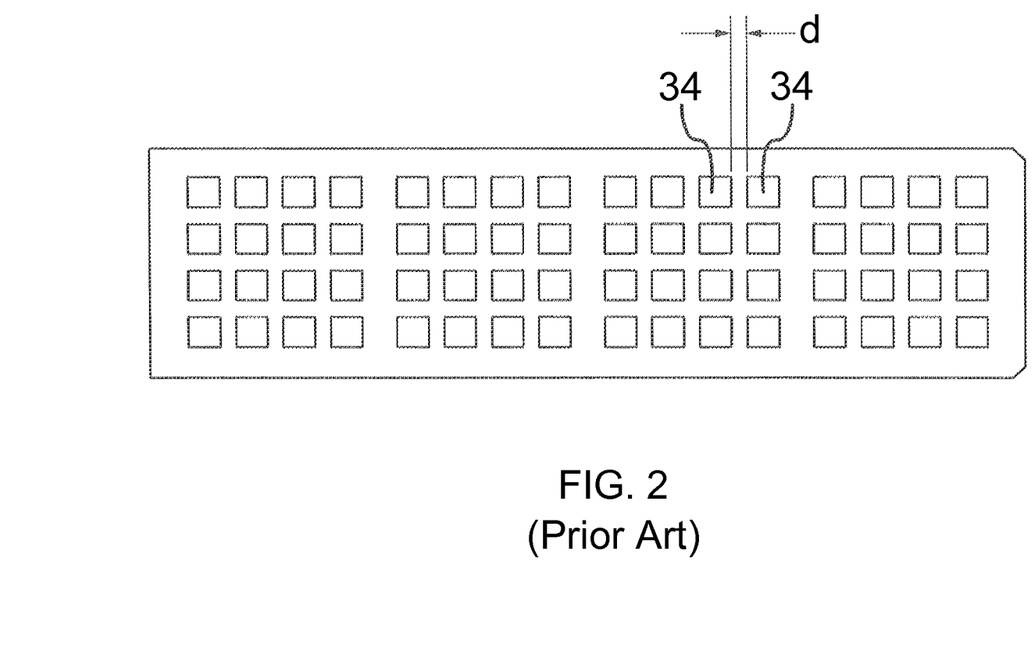
FIG. 2 is a plan view of a wafer with a plurality of image sensors defined thereon, the spacing between individual image sensors being relatively high.

As was illustrated in FIG. 2, without the magnetic shield caps, the image sensors 34 were arranged in four 4×4 arrays of image sensors. In this embodiment, the illustrated area is approximately 62 millimeters by 237 millimeters, and the individual image sensors are 8.5 millimeters by 8.5 millimeters and separated by a distance "d." To avoid or substantially reduce the repelling action of the permanent magnets in adjacent VCMs, the distance "d" in the array shown in FIG. 2 is approximately 4.5 millimeters. With this orientation and layout, the image sensors cover approximately 32% of the surface area of the illustrated area, and 64 camera modules may be assembled in this space without magnetic interference causing undesired movement of adjacent VCMs. As disclosed herein, the repelling force of the permanent magnets can be substantially constrained or controlled by adding one of the magnetic shield caps 50 on top of each VCM.

An illustration of four of the magnetic shield caps is shown in FIG. 5. As discussed above, the magnetic shield cap 50 is positioned over the VCM before it is positioned on the adhesive 36 on the image sensor 34. The magnetic shield cap 50 constrains and controls the flux generated by the permanent magnets. As shown, the shield cap 50 includes four side wall panels 46 that generally match the size of the side walls 48 of the VCM. The upper panel 51 is shown with an opening 52 such that it does not interfere with the optical functioning of the lens 12. An example of material used for the magnetic shield cap 50 is a Co-Netic® foil product, Model AA6F006-4, made by Magnetic Shield Corporation of Bensenville, Ill., having a thickness of 0.15 millimeters. In one embodiment, foil ranging in thickness from approximately 0.05 millimeters to 0.25 millimeters can provide effective shielding with minimum tooling costs, although other thicknesses may also suffice. As should be appreciated, many alternative versions of this material will work, with thicker shielding providing a higher shielding effect. Further, while the caps have been shown as having an opening corresponding with the lens, but that may not be necessary in instances where the cap will be removed prior to operation.

Set forth below in Table 1 is a comparison of repelling distance in millimeters of two adjacent VCMs of the same construction. Fifteen tests were performed involving 30 VCMs of the same construction. In the first test, the repelling distance was determined without a magnetic shield cap 50 in place. In the second test, the repelling distance was determined with a magnetic shield cap 50 in place. For purposes of this test, the foregoing identified Co-Netic Foil AA6F006-4 having a thickness of 0.15 millimeters.

TABLE 1

| | Repel Distance (mm) | |
| --- | --- | --- |
| | W/O Magnetic-Shield Cap | W/ Magnetic-Shield Cap |
| 1 | 4.8213 | 0.1198 |
| 2 | 5.7235 | 0.1403 |
| 3 | 5.4433 | 0.1252 |
| 4 | 4.8012 | 0.1353 |
| 5 | 4.2124 | 0.1461 |
| 6 | 5.4456 | 0.1551 |
| 7 | 4.5100 | 0.1538 |
| 8 | 5.3185 | 0.2207 |
| 9 | 5.1448 | 0.1589 |
| 10 | 5.1197 | 0.1641 |
| 11 | 4.5456 | 0.1609 |
| 12 | 5.6894 | 0.1490 |
| 13 | 4.3446 | 0.1253 |
| 14 | 4.4460 | 0.1461 |
| 15 | 5.2325 | 0.1765 |
| Max | 5.7235 | 0.2207 |
| Min | 4.2124 | 0.1198 |
| Average | 4.9866 | 0.1518 |
| Total QTY (units) | | 30 |

Figure 9:
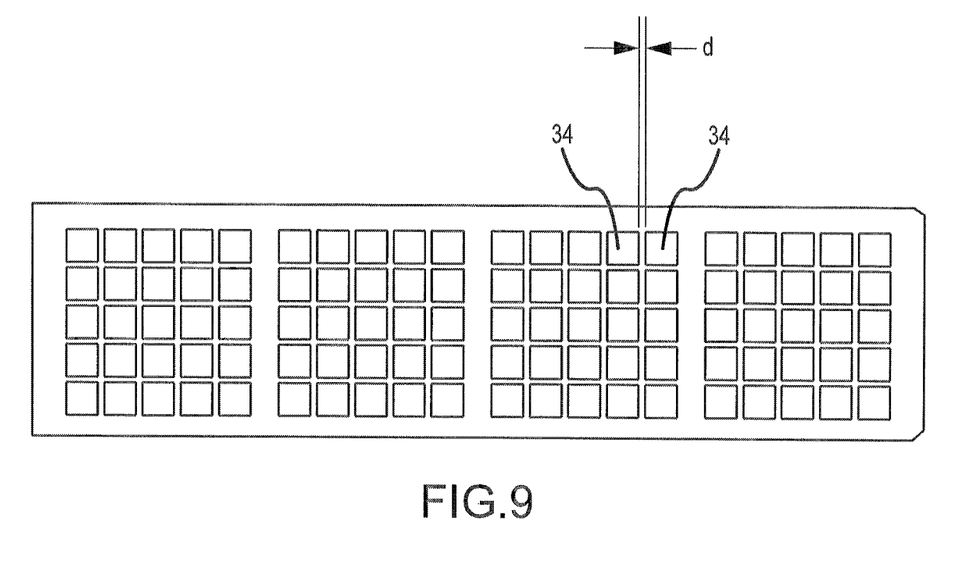
FIG. 9 is a plan view of a wafer with a plurality of image sensors defined thereon, the spacing between individual image sensors being relatively lower than the wafer of FIG. 2.

As can be seen, without a magnetic shield cap 50 in place, the average repelling distance was slightly under 5 millimeters, specifically 4.9866 millimeters. In comparison, with a magnetic shield cap 50 in place, the average repelling distance was reduced by a factor of 33 to 0.1518 millimeters. The resulting effect is that by using magnetic shield caps 50 during the adhesive curing stage of the manufacturing process, adjacent VCMs may be positioned closer together to increase the through-put of the manufacturing process and reduce costs without sacrificing quality or yield. As shown in FIG. 9, using a magnetic shield, the same illustrated area as depicted in FIG. 7 may comfortably hold 100 camera modules 10 during the curing process with the distance "d" separating the VCM camera assemblies modules approximately 1.75 millimeters. As a result, the number of camera modules 10 increases by more than 50% using a substrate of the same size. The data in Table 1 shows that the VCMs may be positioned even closer together utilizing a magnetic shield cap 50. However, the limiting factor is the ability for other tooling to cut the substrate and singulate the individual camera modules from each other. Smaller or more precise tooling may allow even more camera assemblies modules to be utilized within the same area.

In one embodiment the magnetic shield caps 50 are removed from the camera modules 10 following curing of the adhesive, either prior to or following singulation. The removed magnetic shield caps 50 may then be reused during the curing process of a subsequent batch of camera modules, thereby achieving further savings from re-use of the magnetic shield caps 50. Alternatively, it should be appreciated that the magnetic shield caps 50 may remain in place and be included into the final camera module. In such circumstances, the electromagnetic interference shield 18 may be completely removed from the VCM and replaced by the magnetic shield cap 50. The magnetic shield cap 50 will control both the magnetic flux generated by the permanent magnets during the manufacturing process and also the EMI shielding needed to control the electromagnetic flux generated by the electromagnetics sufficient to meet applicable standards. In another embodiment, not illustrated, multiple magnetic shield caps may be formed in a single integral piece. Such a structure may reduce the manufacturing through put time and increase efficiencies in the manufacturing process.

As previously alluded to, for static or slowly varying magnetic fields (below about 100 kHz) the Faraday shielding of the EMI shield described above is ineffective. In these cases, shields made of high magnetic permeability metal alloys can be used, such as sheets of Permalloy and Mu-metal or with nanocrystalline grain structure ferromagnetic metal coatings. These materials do not block the magnetic field, as with electric shielding, but rather draw the field into the material, providing a path for the magnetic field lines around the shielded volume. One optimal shape for magnetic shields is thus a closed container surrounding the shielded volume. The effectiveness of this type of shielding depends on the material's permeability, which generally drops off at both very low magnetic field strengths, and also at high field strengths where the material becomes saturated. So to achieve low residual fields, magnetic shields often include several enclosures, one inside the other, each of which successively reduces the field inside it.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

We claim:

1. A method for manufacturing camera modules, comprising:
    providing a plurality of image sensors on a substrate, including a first and a second image sensor that are adjacent to each other;
    providing a plurality of VCM modules, including a first and a second VCM module, each VCM module adapted for attachment to an image sensor and including a yoke, permanent magnets coupled with the perimeter of an inner wall of the yoke, a coil positioned radially inwardly from the permanent magnets, and an EMI shield surrounding the yoke and configured to restrict electromagnetic flux created by the coil and yoke when current is flowing in the coil;
    providing a plurality of removable magnetic shields, including a first and a second removable magnetic shield, each shield adapted for placement over a VCM module;
    placing the first removable magnetic shield over the first VCM module, thereby controlling a constant magnetic flux generated by the permanent magnets of the first VCM module;
    placing the second removable magnetic shield over the second VCM module, thereby controlling a constant magnetic flux generated by the permanent magnets of the second VCM module;
    positioning the first VCM module, with the first removable magnetic shield over the first VCM module, over the first image sensor;
    positioning the second VCM module, with the second removable magnetic shield over the second VCM module, over the second image sensor;
    positioning the first and second VCM modules with the first and second removable magnetic shields placed thereover on the substrate such that the first and second VCM modules, but not the first and second removable magnetic shields, are affixed with the first and second image sensors;
    moving the first and second image sensors, with the first and second VCM modules and the first and second removable magnetic shields thereon, away from each other; and
    removing the first and second removable magnetic shields from the first and second VCM modules.

2. The method of claim 1, wherein the removable magnetic shields include high magnetic permeability metal alloy material.

3. A method of manufacturing camera modules, each comprising a voice coil module, a lens and an image sensor, the method comprising:
    providing a substrate with a plurality individual of image sensors affixed to the substrate, each image sensor having a perimeter;
    applying an adhesive to the substrate proximate to the perimeter of the image sensors;
    positioning a first removable magnetic shield over a first voice coil module to reduce magnetic flux exiting the first voice coil module;
    positioning a second removable magnetic shield over a second voice coil module to reduce magnetic flux exiting the second voice coil module;
    positioning the first voice coil module, including at least one permanent magnet, with the first removable magnetic shield on the adhesive that is on the substrate and associated with a first image sensor;

positioning the second voice coil module, including at least one permanent magnet, with the second removable magnetic shield on the adhesive that is on the substrate and associated with a second image sensor, the first and second image sensors being adjacent to each other on the substrate, wherein the distance between the first and second voice coil modules on the substrate may be reduced due to the presence of the first and second removable magnetic shields and the total number of voice coil modules positioned on a substrate is increased;

moving the first and second image sensors, with the first and second voice coil modules and the first and second removable magnetic shields thereon, away from each other; and removing the first and second removable magnetic shields from the first and second voice coil modules.

4. The method of claim 3, wherein positioning a first removable magnetic shield over a first voice coil module comprises positioning the first removable magnetic shield relative to the first voice coil module before the first voice coil module is positioned on the adhesive associated with the first image sensor.

5. The method of claim 4, wherein positioning a second removable magnetic shield over a second voice coil module comprises positioning the second removable magnetic shield relative to the second voice coil module before the second voice coil module is positioned on the adhesive associated with the second image sensor.

6. The method of claim 3, wherein positioning the first and second voice coil modules on the adhesive associated with the first and second image sensors comprises aligning the optical axis of a lens associated with the first voice coil module with the optical axis of the first image sensor, and aligning the optical axis of a lens associated with the second voice coil module with the optical axis of the second image sensor.

7. The method of claim 3, further comprising curing the adhesive.

8. The method of claim 7, further comprising singulating the first voice coil module, first image sensor and associated substrate from the remaining substrate, and subjecting the first voice coil module and first image sensor to testing.

9. The method of claim 8, further comprising assembling the first voice coil module and first image sensor in an electronic device comprising a camera.

10. The method of claim 9, further comprising removing the first removable magnetic shield prior to assembling the first voice coil module and first image sensor in an electronic device.

11. The method of claim 10, further comprising reusing the first removable magnetic shield with a different voice coil module in a subsequent manufacturing process.

12. The method of claim 3, wherein the first and second magnetic removable shields comprises foil having a thickness between approximately 0.05 and 0.25 millimeters.

13. The method of claim 3, wherein distance separating the first voice coil module and the second voice coil module is between approximately 1.0 and 4.0 millimeters.

14. The method of claim 3, wherein the first and second removable magnetic shields comprise separate structures.

15. The method of claim 3, further comprising increasing the number of voice coil module and image sensor subcombinations per unit area of substrate between approximately one and fifty percent.

16. An array of assembled camera modules comprising:
a plurality of camera modules, wherein each of the plurality of camera modules include:
a voice coil motor comprising
a yoke, including a permanent magnet and a wire coil;
a electromagnetic flux generated when current flows through the wire coil;
a frame;
an EMI shield surrounding the yoke and configured to restrict the electromagnetic flux generated when current flows through the wire coil; and
a spring between the frame and the EMI shield; and
a lens, movable within the frame and the yoke under the influence of the permanent magnet and the electromagnetic flux; and
a plurality of removable magnetic shield caps formed in a single integral piece, wherein each of the plurality of removable magnetic shield caps is placed over one of plurality of camera modules and is separate from the voice coil motor of the one of the plurality of camera modules, positioned exterior of the voice coil motor of the one of the plurality of camera modules to restrict a magnetic field generated by the permanent magnet of the one of the plurality of camera modules.

17. The array of assembled camera modules of claim 16, further comprising a substrate and a plurality of image sensors affixed to the substrate.

18. The array of assembled camera modules of claim 17, wherein the voice coil motor of the one of the plurality of camera modules is adhered to the substrate and the optical axis of the lens of the one of the plurality of camera modules is aligned with the optical axis of one of the plurality of image sensors.

19. The array of assembled camera modules of claim 16, wherein the distance separating the voice coil motors of two of the plurality of camera modules is between approximately 0.20 and 4.0 millimeters.

20. The array of assembled camera modules of claim 19, wherein the distance separating the voice coil motors of the two of the plurality of camera modules is approximately 1.75 millimeters.

21. The array of assembled camera modules of claim 16, wherein the each of the plurality of removable magnetic shield caps includes four side wall panels and a top planar panel from which the four side wall panels extend from, wherein a portion of the top planar panel that corresponds with the lens of the one of the plurality of camera modules includes an opening such that the each of the plurality of removable magnetic shield caps does not interfere with an optical functioning of the lens of the one of the plurality of camera modules.

* * * * *